(12) United States Patent
Zhao et al.

(10) Patent No.: US 11,107,496 B2
(45) Date of Patent: Aug. 31, 2021

(54) NEAR FIELD TRANSDUCERS INCLUDING PLATINUM GROUP ALLOYS

(71) Applicant: Seagate Technology LLC, Cupertino, CA (US)

(72) Inventors: Tong Zhao, Eden Prairie, MN (US); Martin Blaber, Eagan, MN (US); Li Wan, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/731,526

(22) Filed: Dec. 31, 2019

(65) Prior Publication Data

US 2021/0201942 A1    Jul. 1, 2021

(51) Int. Cl.
| | | |
|---|---|---|
| G11B 5/31 | (2006.01) | |
| G11B 5/39 | (2006.01) | |
| G11B 5/48 | (2006.01) | |
| C22C 5/04 | (2006.01) | |
| G11B 5/00 | (2006.01) | |

(52) U.S. Cl.
CPC ............. *G11B 5/39* (2013.01); *C22C 5/04* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 9,373,777 B2* | 6/2016 | Jan | ............... | G01R 33/098 |
| 9,385,309 B2* | 7/2016 | Gottwald | ............... | G11C 11/161 |
| 9,672,848 B2* | 6/2017 | Blaber | ............... | G11B 5/314 |
| 9,852,748 B1* | 12/2017 | Sahoo | ............... | G11B 5/3106 |
| 9,865,283 B2* | 1/2018 | Blaber | ............... | G11B 5/314 |
| 9,972,346 B2* | 5/2018 | Blaber | ............... | G11B 5/4866 |
| 10,037,771 B2* | 7/2018 | Blaber | ............... | G11B 5/3133 |
| 10,068,592 B1* | 9/2018 | Sahoo | ............... | G11B 5/313 |
| 10,229,704 B2* | 3/2019 | Blaber | ............... | G11B 5/314 |
| 10,403,310 B1* | 9/2019 | Barbosa Neira | ..... | G11B 5/1871 |
| 10,431,244 B2 | 10/2019 | Blaber | ............... | G11B 5/314 |
| 10,482,914 B2* | 11/2019 | Cheng | ............... | C22C 9/08 |
| 10,519,540 B2* | 12/2019 | Zhao | ............... | G11B 5/314 |
| 10,580,439 B2* | 3/2020 | Brons | ............... | G11B 5/3133 |
| 2010/0286382 A1* | 11/2010 | Taesler | ............... | B01L 3/0275 536/23.1 |
| 2014/0050057 A1* | 2/2014 | Zou | ............... | G11B 33/144 369/13.33 |
| 2014/0374376 A1* | 12/2014 | Jayashankar | ........... | C22C 38/06 216/22 |
| 2014/0376348 A1* | 12/2014 | Cheng | ............... | G11B 5/3106 369/13.33 |
| 2015/0248901 A1* | 9/2015 | Itagi | ............... | G11B 5/314 369/13.33 |
| 2016/0351211 A1* | 12/2016 | Blaber | ............... | G11B 5/314 |
| 2017/0249958 A1* | 8/2017 | Blaber | ............... | G11B 5/4866 |
| 2018/0090159 A1* | 3/2018 | Zhao | ............... | G11B 5/3106 |
| 2019/0164571 A1* | 5/2019 | Cheng | ............... | G11B 5/314 |

* cited by examiner

*Primary Examiner* — William J Klimowicz
(74) *Attorney, Agent, or Firm* — Mueting Raasch Group (57) ABSTRACT

Heat assisted magnetic recording (HAMR) devices that includes a near field transducer, the near field transducer including alloys of a first element selected from: platinum (Pt), palladium (Pd), rhodium (Rh), iridium (Ir), ruthenium (Ru), and osmium (Os); and a second element selected from; hafnium (Hf), niobium (Nb), tantalum (Ta), titanium (Ti), vanadium (V), and zirconium (Zr).

16 Claims, 6 Drawing Sheets

NEAR FIELD TRANSDUCERS INCLUDING PLATINUM GROUP ALLOYS

SUMMARY

Disclosed herein is a heat assisted magnetic recording (HAMR) device that includes a near field transducer, the near field transducer including alloys of a first element selected from: platinum (Pt), palladium (Pd), rhodium (Rh), iridium (Ir), ruthenium (Ru), and osmium (Os); and a second element selected from; hafnium (Hf), niobium (Nb), tantalum (Ta), titanium (Ti), vanadium (V), and zirconium (Zr).

Also disclosed are devices that include a light source; a waveguide; and a near field transducer, the near field transducer including alloys of a first element selected from: platinum (Pt), palladium (Pd), rhodium (Rh), iridium (Ir), ruthenium (Ru), and osmium (Os); and a second element selected from; hafnium (Hf), niobium (Nb), tantalum (Ta), titanium (Ti), vanadium (V), and zirconium (Zr), wherein the light source, waveguide and near field transducer are configured to transmit light from the light source to the waveguide and finally the near field transducer.

Further disclosed are systems that include a light source; a near field transducer, the near field transducer including alloys of a first element selected from: platinum (Pt), palladium (Pd), rhodium (Rh), iridium (Ir), ruthenium (Ru), and osmium (Os); and a second element selected from; hafnium (Hf), niobium (Nb), tantalum (Ta), titanium (Ti), vanadium (V), and zirconium (Zr); a magnetic reader; and a magnetic writer, wherein the light source and the near field transducer are configured to transmit light from the light source to the near field transducer in order to assist the magnetic writer with writing.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The very high temperatures that the NFT reaches during operation can lead to diffusion of the material of the NFT (for example gold) from the peg and towards the disk. In addition, a portion of the NFT may be exposed at the air bearing surface of the recording head and is thus subject to mechanical wearing. NFT performance is greatly influenced by the heat and mechanical stress during HAMR operation. It would therefore be advantageous to have NFT devices that are more durable.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. Disclosed NFTs can be utilized in disc drives or in other devices that include a near field transducer.

Figure 1:
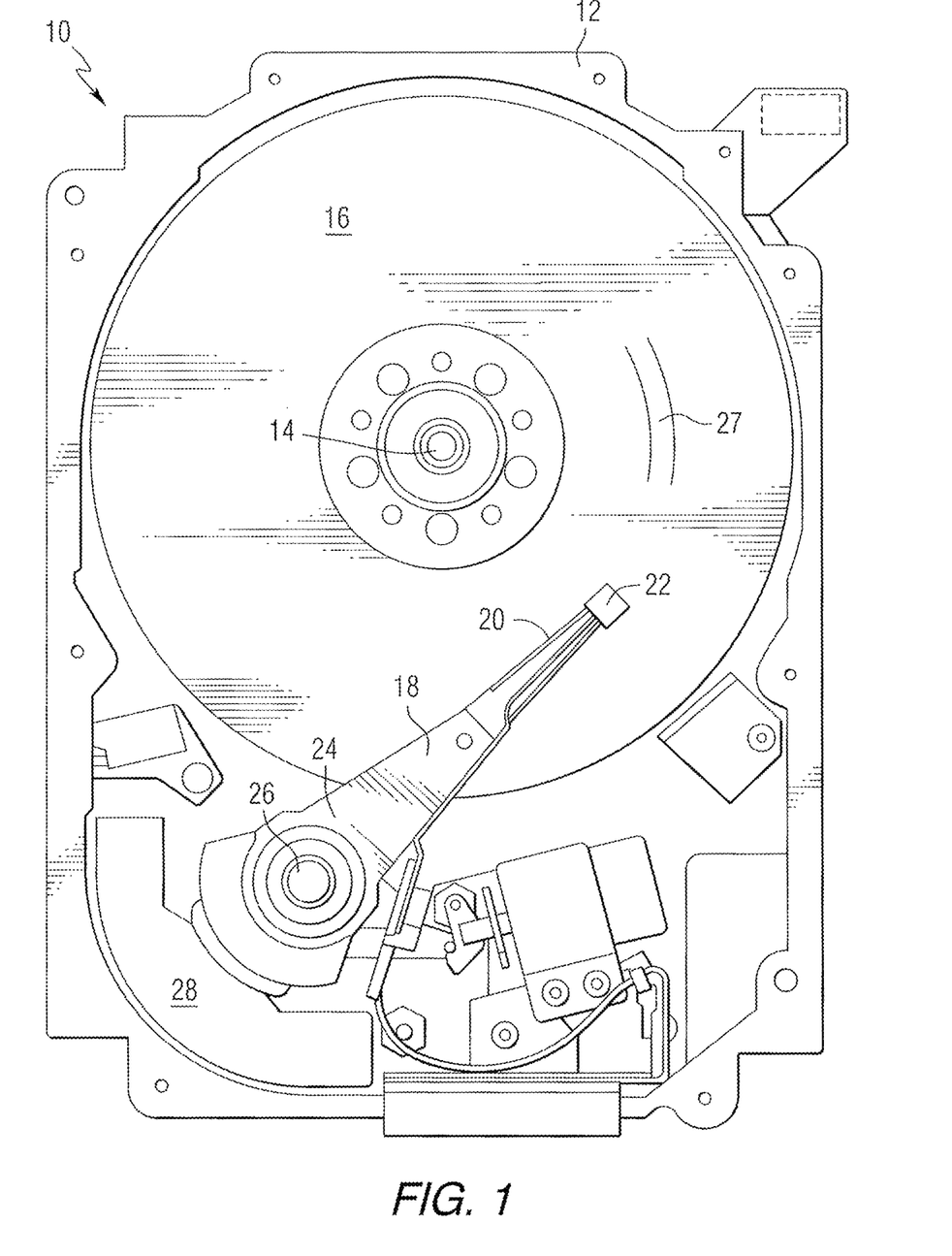
FIG. 1 is a pictorial representation of a data storage device in the form of a disc drive that can include a recording head constructed in accordance with an aspect of this disclosure.
Figure 2:
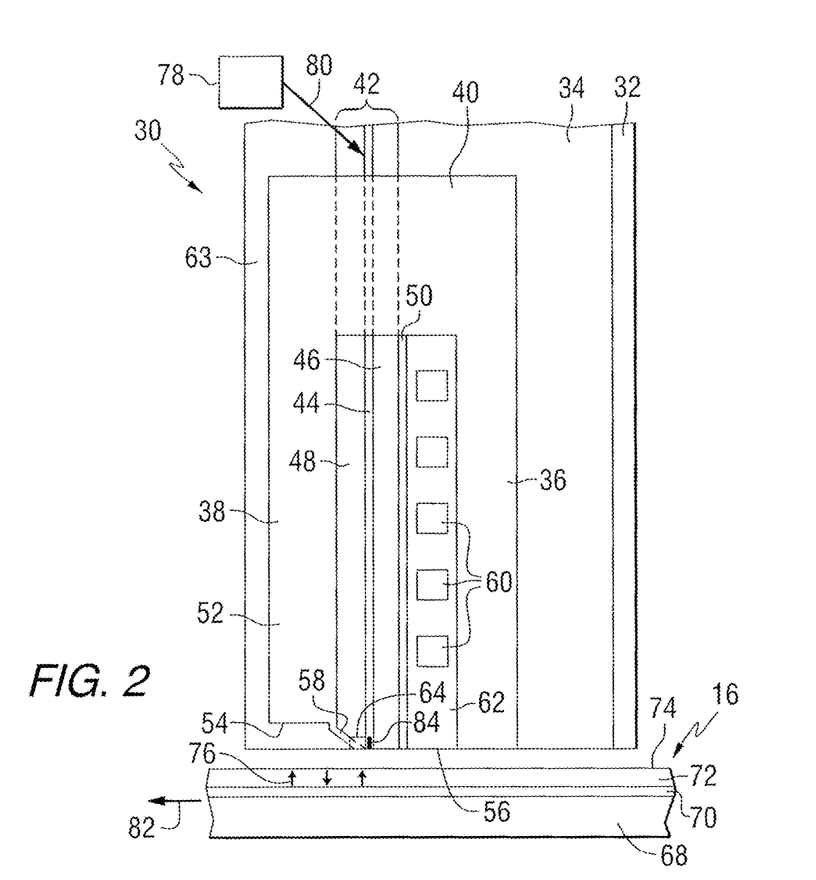
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be Ta$_2$O$_5$, and the cladding layers (and other insulating layers) can be Al$_2$O$_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near-field transducer (NFT) 84 is positioned in or adjacent to the waveguide and at or near the air bearing surface. The heat sink material may be chosen such that it does not interfere with the resonance of the NFT.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Figure 3:
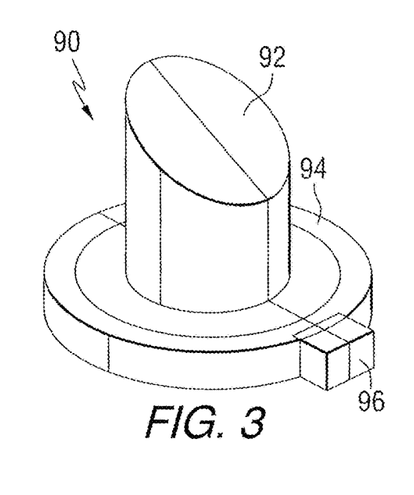
FIG. 3 is a schematic representation of a near field transducer.

FIG. 3 is a schematic view of a lollypop NFT 90 in combination with a heat sink 92. The NFT includes a disk shaped portion 94 and a peg 96 extending from the disk shaped portion. The heat sink 92 can be positioned between the disk shaped portion and the sloped portion of the top pole in FIG. 2. When mounted in a recording head, the peg may be exposed at the ABS and thus can be subjected to mechanical wearing.

Figure 4:
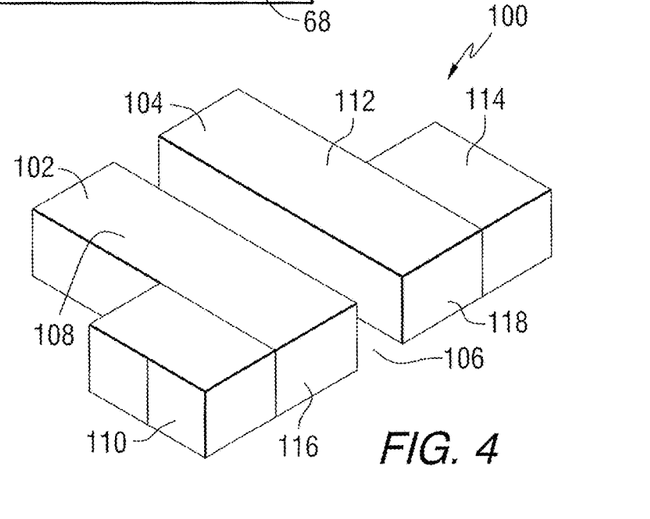
FIG. 4 is a schematic representation of another near field transducer.

FIG. 4 is a schematic view of a coupled nanorod (CNR) NFT 100. This NFT includes two nanorods 102 and 104 separated by a gap 106. Nanorod 102 includes a first portion 108 and a second portion 110. Nanorod 104 includes a first portion 112 and a second portion 114. When mounted in a recording head, the ends 116 and 118 of the nanorods may be exposed at the ABS and thus be subject to mechanical wearing. FIGS. 3 and 4 show example NFTs. However, the disclosure is not limited to any particular type of NFT. The materials described below may be used in various NFT configurations.

Figure 5:
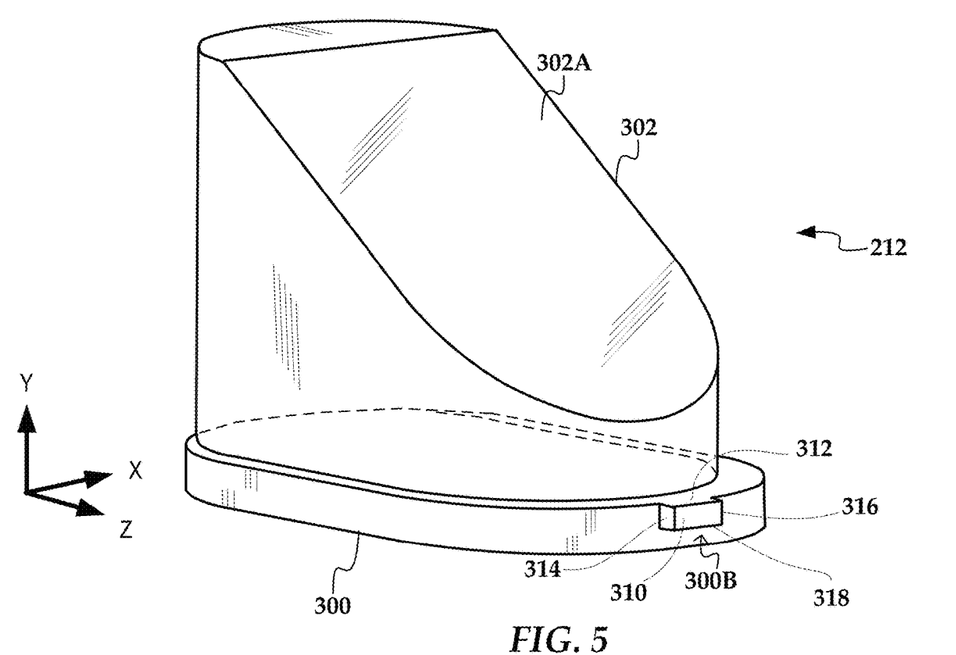
FIG. 5 is a perspective view of a near-field transducer according to an illustrative embodiment.

In FIG. 5, a perspective views show details of a device 212 including a NFT. The device 212 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element.

The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 6:
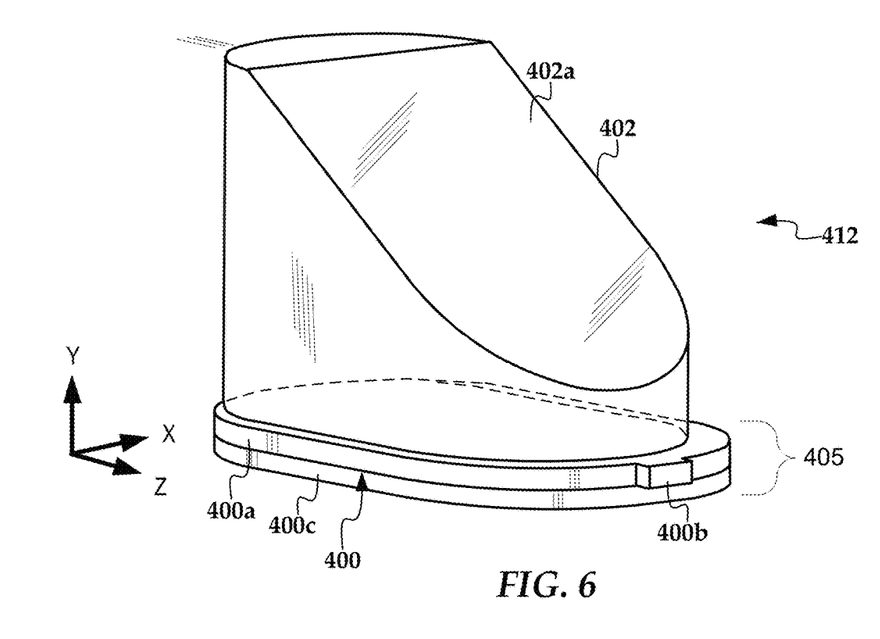
FIG. 6 is a perspective view of a near-field transducer according to an illustrative embodiment.

In FIG. 6, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole.

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 5. This can also be described as the peg extending beyond the bottom disc 400c. In some embodiments, such as that depicted in FIG. 6, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

In some embodiments, disclosed NFTs or a portion of a NFT include platinum group metals or their alloys. Platinum group alloys, which are also sometimes referred to as superalloys may have properties that make them a desirable choice for the material of the NFT. Platinum group metals have an intrinsic fcc crystal structure. When mixed with a second element, X, the intrinsic fcc crystal structure might be preserved when the amount of X is below its solid solubility in the platinum group metal. When the amount of second element is increased, some platinum group alloys can have L1$_2$ crystal structures. Typically, platinum group alloys form $L1_2$ crystal structures in (Platinum group element)$_3$ Second element (e.g., $Ir_3X$, $Rh_3X$). Additionally, or alternatively, some platinum group alloys can have a mixture of or both fcc and $L1_2$ crystal structures. The two phase coherent structure that includes $L1_2$ and fcc may be advantageous because it can provide enhanced mechanical strength even at high temperatures, higher hardnesses, higher melting points, improved oxidation resistance, or some combination thereof. Platinum group alloys with a $L1_2$ crystal structure are usually with degraded optical properties for the application in NFT and also with lowered thermal conductivity causing poorer heat dissipation. The two phase coherent structure that includes $L1_2$ and fcc contents lesser amount of the second element and thus it has a lower optical impact and thermal conductivity impact than does only the $L1_2$ structure. Any of these properties may be advantageous when the material is used to form a NFT, especially in the context of a NFT for use in a HAMR head.

Platinum group alloys can include a first element, which is an element from the platinum group of the periodic table and a second element. Illustrative platinum group elements include platinum (Pt), palladium (Pd), rhodium (Rh), iridium (Ir), ruthenium (Ru), and osmium (Os). In some embodiments the first element is iridium (Ir). In some embodiments the first element is rhodium (Rh).

The second element(s) in a platinum group alloy as disclosed herein can be selected from hafnium (Hf), niobium (Nb), tantalum (Ta), titanium (Ti), vanadium (V), zirconium (Zr), and combinations thereof. In some embodiments, more than one $L1_2$ structured alloy can coexist in one material, e.g., Ir alloyed with Hf and Zr can form IrHf and IrZr separately. In some embodiments the second elements is hafnium (Hf). In some embodiments, the second element is zirconium (Zr).

In some embodiments, the platinum group element is iridium (Ir) and the second element is hafnium (Hf), or zirconium (Zr). Iridium and hafnium have a relatively large lattice mismatch, which induces a relatively low solubility of hafnium (as well as other second elements) in iridium (for example). In some embodiments where the first element is iridium and the second element is hafnium, the alloy can have a face centered cubic (fcc) structure, a $L1_2$ structure, or a combination thereof. In some embodiments where the first element is iridium and the second element is hafnium, the alloy can be a mixture of a face centered cubic (fcc) structure and a $L1_2$ structure.

The relative amounts of fcc structure and $L1_2$ structure can be determined as well. In some embodiments, the amounts of various crystal structures including fcc and $L1_2$ can be determined using x-ray diffraction (XRD). In some embodiments of platinum alloys, the presence and or amounts of the fcc, the $L1_2$, or both crystal structures can be controlled at least in some part by the amount of the second element in the alloy. In general, the amount of the L12 phase increases as the amount of the hafnium, or any other second element, in the alloy increases. In embodiments where it is desired to have a combination of fcc and $L1_2$ structures, the amount of the second element can be not greater than 38 at %, not greater than 28 at %, not greater than 20 at %, or not greater than 6 at %. In embodiments where it is desired to have a combination of fcc and $L1_2$ structures, the amount of the second element can be not less than 0.1 at %, not less than 1 at %, or not less than 5 at %, for example. In embodiments where the first element is iridium and the second elements is hafnium, and it is desired to have a combination of fcc and $L1_2$ structures, the amount of the second element can be not greater than 38 at %, not greater than 28 at %, or not greater than 22 at %. In embodiments where the first element is iridium and the second elements is hafnium and it is desired to have a combination of fcc and $L1_2$ structures, the amount of the second element can be not less than 0.1 at %, not less than 1 at %, or not less than 5 at %, for example.

In some embodiments, the platinum group element is rhodium (Rh) and the second element is hafnium (Hf), or zirconium (Zr). In some embodiments the first element is rhodium and the second element is hafnium (Hf). In some embodiments the first element is rhodium and the second element is zirconium (Zr).

The amount of the first element and the second element can vary. In some embodiments, the less of the second element present, the more likely the combination of the fcc and the $L1_2$ two-phase structure is obtained. Generally, the platinum group element or the first element is present in an higher amount than the second element. In some embodiments, the second element in the alloy is present in an amount that is the amount of the second element can be not greater than 38 at %, not greater than 28 at %, not greater than 20 at %, or not greater than 6 at %. In some embodiments, the second element in the alloy is present in an amount that is not less than 0.1 at %, not less than 1 at %, or not less than 5 at %, for example.

In some alternative embodiments, a NFT can alternatively be made from a multilayer structure that includes at least one layer of a platinum group element and at least one layer of a second element. In some such embodiments, the individual layers can be the same or different thicknesses. The thickness of individual layers, the amount of layers, or both can be determined, at least in part based on the same upper and lower limits above considering the overall multilayered structure as the entire alloy. In some embodiments, thinner individual layers may be desired because they would alloy for more uniform mixing. In some embodiments, a top layer of the platinum group metal might be advantageous to prevent or at least minimize oxidation of the second element.

Some embodiments can also take advantage of a seed layer upon which can be deposited the platinum group alloy. In some embodiments, the seed layer can include hafnium (Hf). The thickness of an optional seed layer can vary. In some embodiments, the thickness of an optional seed layer, for example, an optional hafnium seed layer can be not greater than 30 Angstroms (Å), not greater than 10 Å, or even not greater than 7.5 Å. In some embodiments, the thickness of an optional seed layer, for example, an optional hafnium seed layer can have a thickness that is not less than a few monolayers thick, 1 Å thick, or even 2 Å thick.

Platinum group alloys can be formed using various methods and steps. In some embodiments, the two (or more) elements can be co-sputtered from separate targets (e.g., one for each element), can be sputtered from a single target (e.g., a target that includes both elements), can be formed by Ion Beam Deposition (IBD) from a single target (e.g., a target that includes both elements) or from separate targets (e.g., one for each element), can be formed by thermal evaporation or electron beam evaporation from a single source (e.g., a target that includes both elements) or multiple sources (e.g., one for each element), or a combination thereof.

EXAMPLES

Figure 7:
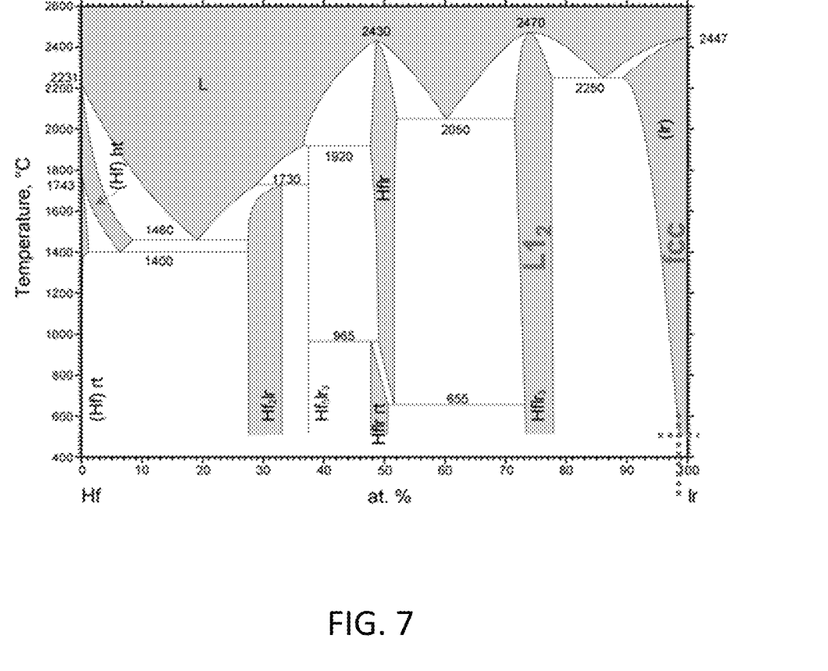
FIG. 7 shows a full phase diagram of Ir—Hf.
Figure 8:
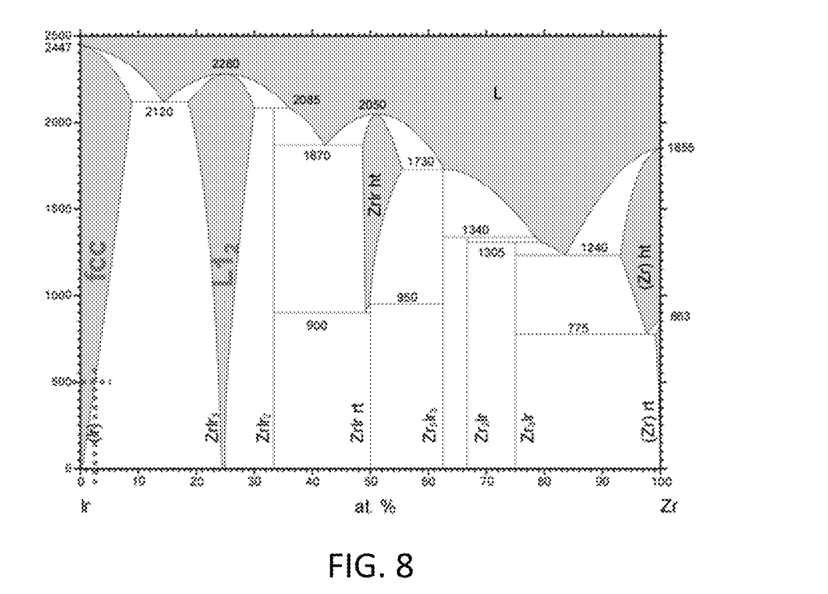
FIG. 8 shows a full phase diagram of Ir—Zr.

Platinum alloys including both iridium (Ir) and hafnium (Hf) and Iridium (Ir) and zirconium (Zr) were co-sputtered from an iridium target and a hafnium target. FIG. 7 shows a full phase diagram of Ir—Hf and FIG. 8 shows a full phase diagram of Ir—Zr. It is noted that such diagrams can also be useful when determining the concentration of the second element. Table 1 below shows the amount of hafnium (at %) in each alloy and the thickness of the layer formed (Tck) as well as various properties (thermal conductivity (TC) measured on as-grown film, after 225 C/3 hr anneal and after 450 C/3 hr anneal, post annealed TC/As-Grown TC ratios, refractive index (n) and extinction coefficient (k) of the alloys. Annealing is able to improve TC which is a result of grain growth. With increasing Hf level, the relative TC change upon annealing decreases, indicating improved grain stability.

TABLE 1

| Hf at % | Tck (W/mK) | TC (W/mK) | | | TC/TC_As Grown | | Optical @ 830 nm | |
|---|---|---|---|---|---|---|---|---|
| | | As Grown | 225 C. | 450 C. | 225 C. | 450 C. | n | k |
| 0.00% | 300.8 | 34.7 | 38.2 | 58.8 | 1.1 | 1.69 | 3.2229 | 6.7232 |
| 0.50% | 305.8 | 33.3 | 36.4 | 50.7 | 1.09 | 1.52 | 3.262 | 6.7483 |
| 1.00% | 304.5 | 32.2 | 34.9 | 46.5 | 1.09 | 1.44 | 3.2743 | 6.7214 |
| 2.10% | 300.4 | 29.7 | 31.6 | 38.9 | 1.07 | 1.31 | 3.2777 | 6.6784 |
| 3.00% | 299.1 | 28.1 | 29.7 | 35.2 | 1.06 | 1.26 | 3.3387 | 6.6815 |
| 5.90% | 302.7 | 20.1 | 20.7 | 22.2 | 1.03 | 1.11 | 3.392 | 6.5589 |
| 25.70% | 294.6 | 7.8 | 7.8 | 8.1 | 1 | 1.04 | 3.9425 | 5.5231 |

Figure 9:
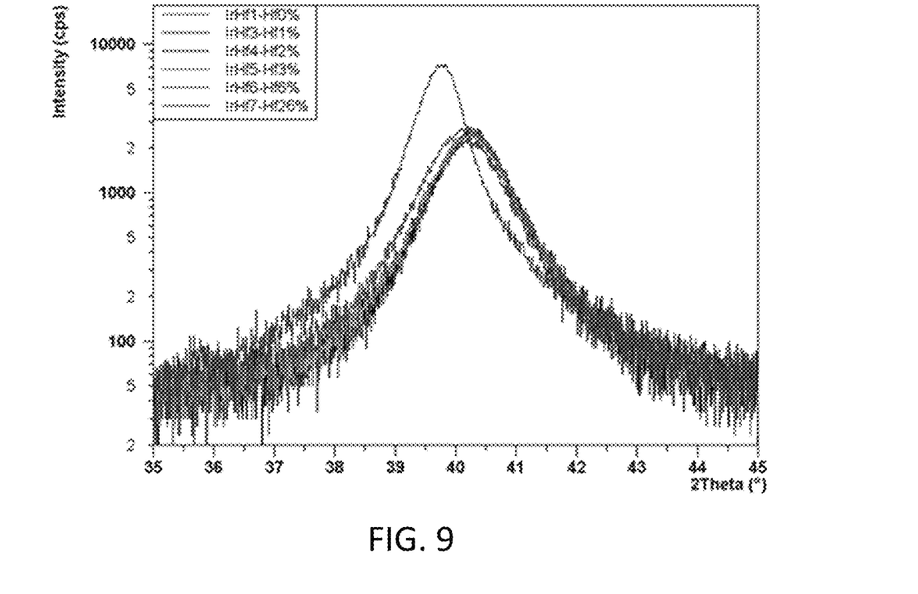
FIG. 9 is XRD θ~2θ Scans.
Figure 10:
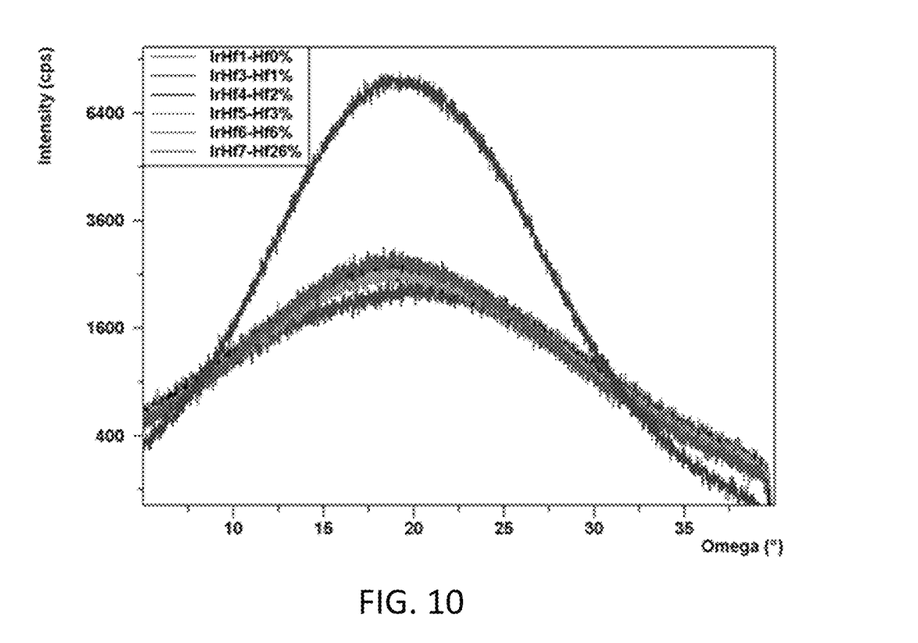
FIG. 10 Ir(111) or Ir$_3$Hf(111) ω Rocking Curve Scan.

Platinum alloys including both iridium (Ir) and hafnium (Hf) were co-sputtered from an iridium target and a hafnium target. The crystallographic structures of IrHf alloy thin films with various Hf levels were studied by X-ray Diffraction (XRD). All the IrHf film show a (111) out-of-plane texture. FIG. 9 is XRD θ-2θ Scans and FIG. 10 Ir(111) or Ir$_3$Hf(111) ω Rocking Curve Scan.

Table 2 below shows the amount of hafnium (at %) in each alloy, the thermal conductivity (TC), IrHf111/Si400 (the X-ray diffraction intensity ratio between IrHf111 (film) and Si400 (substrate) as a measure of crystallized phases) IrHf111 FWHM (full width at half maximum which is related to crystalline grain size), grain size calculated from the Ir111 FWHM using the Scherrer Equation, and IrHf111 Rocking Curve FWHM which measures how well the IrHf111 crystallites aligned along the film normal direction (out-of-plane).

TABLE 2

| Hf at % | Tck (W/mK) | IrHF111/ Si400 | IrHF111 FWHM (°) | Grain Size (A) | IrHF111 Rocking (°) |
|---|---|---|---|---|---|
| 0 | 34.7 | 4.74E−04 | 0.9815 | 96 | 16.7 |
| 0.5 | 33.3 | N/A | N/A | N/A | N/A |
| 1 | 32.2 | 4.37E−04 | 1.0293 | 91 | 17 |
| 2.1 | 29.7 | 4.82E−04 | 1.0345 | 91 | 15.9 |
| 3 | 28.1 | 4.80E−04 | 1.0278 | 91 | 16 |
| 5.9 | 20.1 | 5.33E−04 | 1.1311 | 83 | 14.7 |
| 25.7 | 7.8 | 1.44E−02 | 0.684 | 137 | 10.5 |

As shown in FIG. 9, XRD (111) diffraction shifts from the fcc phase to the L1$_2$ phase with increasing Hf level. With amounts greater than about 6 at %, the (111) intensity and crystallinity improves slightly with increasing hafnium amounts. With amounts of hafnium of about 26 at %, the (111) intensity is higher, larger grains are obtained and there is better crystallinity than pure iridium, indicating that the L1$_2$ phase improves crystal formation. The XRD (111) diffraction peaks can be fitted into two separate peaks with a Lorentzian function, one for the fcc phase and one for the L1$_2$ phase. And the amounts of the fcc phase and the L1$_2$ phase can be estimated by comparing the integrated XRD peak intensity (peak area) between the two. The data in Table 2 was based on the XRD data.

Table 3 below shows the amount of hafnium (at %) in each alloy, the area and FWHM of the L1$_2$ peaks, the area and FWHM of the fcc peaks and the ratio of L12/(L12+fcc) which is a rough estimate of the L1$_2$ phase volume fraction. L12 phase increases as Hf level. There is a 4.4% L12 phase in pure Ir as background due to XRD fitting accuracy. When Hf is below <1% Hf, it is in fcc phase When 2%<Hf<26%, it is a mixture of fcc+L12 phases. When Hf is greater than Hf, it is with L12 phase. The results are consistent with the Ir—Hf phase diagram in FIG. 7.

TABLE 3

| | L12 | | fcc | | L12/ |
|---|---|---|---|---|---|
| Hf % | Area | FWHM | Area | FWHM | (L12 + fcc) |
| 0.0% | 55.0 | 0.68 | 1207.0 | 1.00 | 4.4% |
| 0.5% | TBD | TBD | TBD | TBD | TBD |
| 1.0% | 59.0 | 0.68 | 1067.0 | 1.04 | 5.2% |
| 2.1% | 129.0 | 0.65 | 1153.0 | 1.01 | 10.1% |
| 3.0% | 133.6 | 0.65 | 1135.0 | 1.02 | 10.5% |
| 5.9% | 224.4 | 0.71 | 1227.0 | 1.08 | 15.5% |
| 25.7% | 2516.0 | 0.71 | 0.0 | N/A | 100.0% |

A 30 nm thick layer of IrHf platinum alloy were co-sputtered from an iridium target and a hafnium target onto a 5 A Hf seed layer. The hafnium at % in the IrHf alloy film, the thickness of the IrHf layer and the thermal conductivity (TC) measured on as-grown film, after 225 C/3 hr anneal and after 450 C/3 hr anneal, post annealed TC/As-Grown TC ratio as well as the optical n, k are reported in Table 4 below.

TABLE 4

| Hf at % | Tck (A) | TC (W/mK) | | | TC/TC As Grown | | Optical @ 830 nm | |
| --- | --- | --- | --- | --- | --- | --- | --- | --- |
| | | As Grown | 225 C. | 450 C. | 225 C. | 450 C. | n | k |
| 0.00% | 300.7 | 46.4 | 50.6 | 62.9 | 1.09 | 1.36 | 3.2716 | 6.6425 |
| 0.50% | 305.8 | 44.7 | 48.6 | 58.6 | 1.09 | 1.31 | N/A | N/A |
| 1.00% | 304.6 | 42.5 | 46 | 53.9 | 1.08 | 1.27 | N/A | N/A |
| 2.10% | 300.3 | 38.7 | 41.6 | 47.2 | 1.08 | 1.22 | N/A | N/A |
| 3.00% | 299.1 | 35.8 | 38.1 | 42.3 | 1.06 | 1.18 | 3.3377 | 6.5216 |
| 5.90% | 302.7 | 23.9 | 25 | 26.7 | 1.04 | 1.12 | 3.3602 | 6.3782 |
| 25.70% | 294.7 | 7.8 | 8 | 8.2 | 1.02 | 1.05 | 4.0367 | 5.3737 |

As seen in Table 4, the thermal conductivity of the IrHf alloy is improved by a 5 Å seed layer, which is likely due to improved crystallinity confirmed by XRD (data not shown here) The improvement by a hafnium seed layer decreases with increasing amounts of hafnium in the IrHf alloy. With at % of hafnium not greater than 3 at % on a 5 Å hafnium seed layer, the thermal conductivity is not worse than pure IrHf without seed. Also, with the addition of a 5 A Hf seed, the TC change upon annealing is further reduced, indicating a 5 A Hf seed is helping further improve IrHf grain stability.

Figure 11:
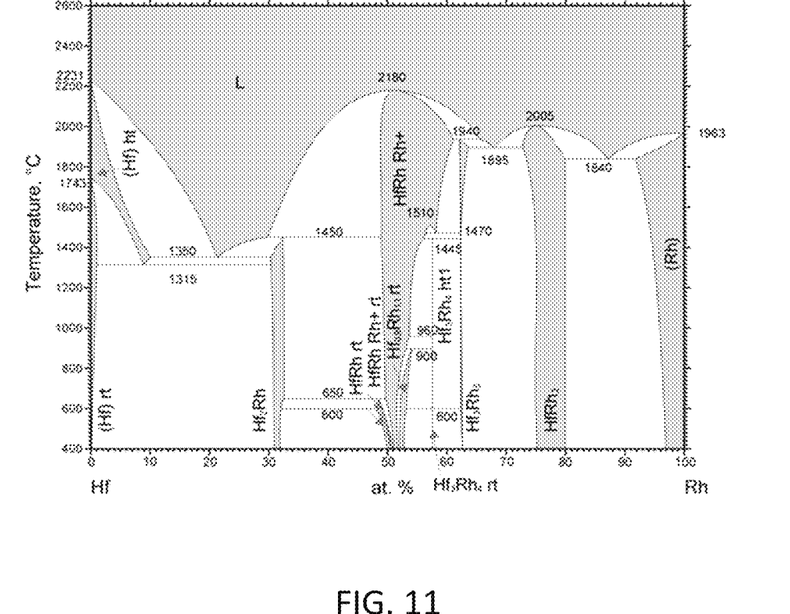
FIG. 11 shows a full phase diagram of Rh—Hf.
Figure 12:
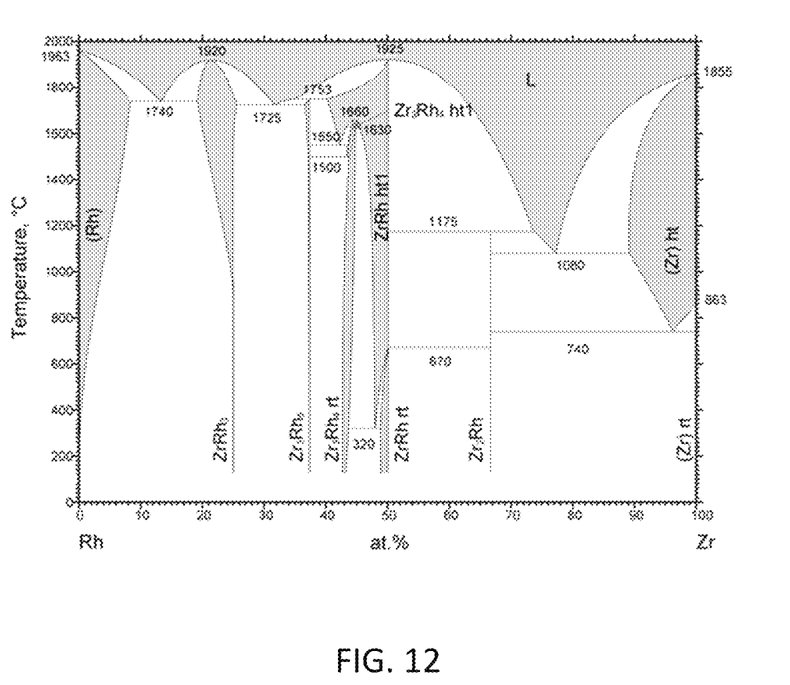
FIG. 12 shows a full phase diagram of Rh—Zr.

FIG. 11 shows a full phase diagram of Rh—Hf and FIG. 12 shows a full phase diagram of Rh—Zr. It is noted that such diagrams can also be useful when determining the concentration of the second element.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of materials for near field transducers and near field transducers containing the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A heat assisted magnetic recording (HAMR) device comprising:
   a near field transducer, the near field transducer comprising alloys comprising
   a first element selected from: platinum (Pt), palladium (Pd), rhodium (Rh), iridium (Ir), ruthenium (Ru), and osmium (Os); and
   not greater than 6 atomic percent (at %) of a second element selected from: hafnium (Hf), niobium (Nb), tantalum (Ta), titanium (Ti), vanadium (V), and zirconium (Zr).

2. The device according to claim 1, wherein the first element is iridium (Ir).

3. The device according to claim 2, wherein the alloy has a face centered cubic (fcc) structure, a L 12 structure, or a combination thereof.

4. The device according to claim 2, wherein the second element is hafnium (Hf), or zirconium (Zr).

5. The device according to claim 4, wherein the second element is hafnium (Hf).

6. The device according to claim 5, wherein the alloy comprising the first and second elements is formed on a seed layer.

7. The device according to claim 6, wherein the seed layer comprises hafnium (Hf).

8. The device according to claim 7, wherein the seed layer has a thickness of less than 30 Angstroms (Å).

9. The device according to claim 4, wherein the second element is zirconium (Zr).

10. The device according to claim 1, wherein the first element is rhodium (Rh).

11. The device according to claim 10, wherein the second element is hafnium (Hf).

12. The device according to claim 10, wherein the second element is zirconium (Zr).

13. A device comprising:
- a light source;
- a waveguide; and
- a near field transducer, the near field transducer comprising alloys comprising
  - a first element selected from: platinum (Pt), palladium (Pd), rhodium (Rh), iridium (Ir), ruthenium (Ru), and osmium (Os); and
  - not greater than 6 atomic percent (at %) of a second element selected from: hafnium (Hf), niobium (Nb), tantalum (Ta), titanium (Ti), vanadium (V), and zirconium (Zr),
- wherein the light source, waveguide and near field transducer are configured to transmit light from the light source to the waveguide and finally the near field transducer.

14. The device according to claim 13, wherein the second element is hafnium (Hf), or zirconium (Zr).

15. The device according to claim 14, wherein the first element is iridium (Ir), or rhodium (Rh).

16. A system comprising:
- a light source;
- a near field transducer, the near field transducer comprising alloys comprising
  - a first element selected from: platinum (Pt), palladium (Pd), rhodium (Rh), iridium (Ir), ruthenium (Ru), and osmium (Os); and
  - not greater than 6 atomic percent (at %) of a second element selected from: hafnium (Hf), niobium (Nb), tantalum (Ta), titanium (Ti), vanadium (V), and zirconium (Zr);
- a magnetic reader; and
- a magnetic writer,
- wherein the light source and the near field transducer are configured to transmit light from the light source to the near field transducer in order to assist the magnetic writer with writing.

* * * * *